(12) United States Patent
Li

(10) Patent No.: US 7,975,617 B2
(45) Date of Patent: Jul. 12, 2011

(54) ROUTING DEVICE

(75) Inventor: Xiaolong Li, Hefei (CN)

(73) Assignee: Hefei Bopu High-Tech Co., Ltd., Hefei (CN)

( * ) Notice: Subject to any disclaimer, the term of this patent is extended or adjusted under 35 U.S.C. 154(b) by 0 days.

(21) Appl. No.: 12/786,432

(22) Filed: May 25, 2010

(65) Prior Publication Data

US 2010/0326315 A1 Dec. 30, 2010

Related U.S. Application Data

(63) Continuation of application No. 12/641,770, filed on Dec. 18, 2009, and a continuation-in-part of application No. 12/212,769, filed on Sep. 18, 2008, now Pat. No. 7,789,020, which is a continuation-in-part of application No. PCT/CN2007/000639, filed on Feb. 28, 2007, application No. 12/786,432, which is a continuation of application No. PCT/CN2008/001125, filed on Jun. 11, 2008.

(30) Foreign Application Priority Data

| | | |
|---|---|---|
| Mar. 18, 2006 | (CN) | 2006 1 0067588 |
| Apr. 9, 2006 | (CN) | 2006 1 0074440 |
| Jan. 17, 2007 | (CN) | 2007 1 0007685 |
| Jun. 18, 2007 | (CN) | 2007 1 0126750 |

(51) Int. Cl.
*E01B 25/00* (2006.01)

(52) U.S. Cl. .................. 104/130.01; 105/72.2

(58) Field of Classification Search .............. 105/72.2, 105/215.1, 215.2; 104/30, 31, 32, 32.1, 35, 104/48, 262, 273; 180/167, 168, 169
See application file for complete search history.

(56) References Cited

U.S. PATENT DOCUMENTS

| | | | | |
|---|---|---|---|---|
| 4,566,391 A | * | 1/1986 | Haberl et al. | 105/215.1 |
| 4,708,066 A | * | 11/1987 | Heckman | 105/215.2 |
| 5,289,778 A | * | 3/1994 | Romine | 104/88.04 |
| 5,369,591 A | * | 11/1994 | Broxmeyer | 701/301 |
| 5,390,118 A | * | 2/1995 | Margolis et al. | 701/23 |
| 6,012,396 A | * | 1/2000 | Schulz | 105/72.2 |
| 6,050,359 A | * | 4/2000 | Mouri et al. | 180/415 |
| 6,123,029 A | * | 9/2000 | Mobley | 105/4.1 |

(Continued)

FOREIGN PATENT DOCUMENTS

EP 1652698 A1 * 5/2006

(Continued)

*Primary Examiner* — S. Joseph Morano
*Assistant Examiner* — Jason C Smith
(74) *Attorney, Agent, or Firm* — Matthias Scholl P.C.; Matthias Scholl (57) ABSTRACT

A routing device, including a sliding device, a rotating shaft, a pair of route rails, a pair of rams, and a pillow, wherein the route rail is disposed in the front of a railway track, the route rails are disposed on the rams, the rotating shaft is disposed at one end of the ram in the vicinity of the railway track, and connected to the pillow, the sliding device is disposed between the ram and the pillow, and the ram operates to laterally slide on the pillow. The invention features simple structure and low investigation cost, occupies small space, is not only applicable for route of normal road and rail vehicles, but also for that of long multi-axis vehicles composed of tractors and trailers, or vehicle trains, and thus enabling the road and rail vehicles to be widely used and saving power.

8 Claims, 5 Drawing Sheets

U.S. PATENT DOCUMENTS

| | | | |
|---|---|---|---|
| 6,352,035 B1 * | 3/2002 | Kashiwase et al. | 105/72.2 |
| 6,976,432 B2 * | 12/2005 | Jacob | 105/72.2 |
| 7,077,065 B2 * | 7/2006 | Tremblay et al. | 105/72.2 |
| 7,082,879 B2 * | 8/2006 | Alt | 104/88.01 |
| 2001/0050026 A1 * | 12/2001 | Esposito et al. | 105/215.2 |
| 2002/0162727 A1 * | 11/2002 | Matsuo | 198/412 |
| 2002/0165648 A1 * | 11/2002 | Zeitler | 701/23 |
| 2004/0094062 A1 * | 5/2004 | Jackson et al. | 105/72.2 |
| 2004/0250724 A1 * | 12/2004 | Sobolewski | 105/215.1 |
| 2005/0204949 A1 * | 9/2005 | Jacob | 105/72.2 |
| 2006/0027136 A1 * | 2/2006 | Hunzinger | 105/72.2 |
| 2007/0089637 A1 * | 4/2007 | Sproat | 105/72.2 |
| 2007/0119333 A1 * | 5/2007 | Dupont et al. | 105/72.2 |
| 2007/0289477 A1 * | 12/2007 | Sobolewski | 105/215.2 |
| 2009/0050011 A1 * | 2/2009 | Li | 104/130.01 |

FOREIGN PATENT DOCUMENTS

WO    WO 2005014313 A1 *    2/2005

* cited by examiner

ROUTING DEVICE

CROSS-REFERENCE TO RELATED APPLICATIONS

This application is a continuation of U.S. Ser. No. 12/641,770 filed on Dec. 18, 2009. This application is also a continuation in part of U.S. Ser. No. 12/212,769 filed on Sep. 18, 2008 now U.S. Pat. No. 7,789,020, which is a continuation in part of International Patent Application No. PCT/CN 2007/000639, with an international filing date on Feb. 28, 2007, which is based on Chinese Patent Applications No. 200610067588.8, filed on Mar. 18, 2006, on Chinese Patent Applications No. 200610074440.7, filed on Apr. 9, 2006, and on Chinese Patent Applications No. 200710007685.2, filed on Jan. 17, 2007. This application is also a continuation of International Patent Application No. PCT/CN2008/001125 with an international filing date of Jun. 11, 2008, designating the United States, now pending, and further claims priority benefits to Chinese Patent Application No. 200710126750.3 filed on Jun. 18, 2007. The contents of all of these specifications are incorporated herein by reference.

BACKGROUND OF THE INVENTION

1. Field of the Invention

The invention relates to a transportation device, and more particularly to a routing device.

2. Description of the Related Art

Nowadays routing devices are widely in a field of a road and rail vehicle to facilitate fast switching of vehicles between a road and a railway track. However, there are several non-neglectable problems with conventional routing devices: structure thereof is complex, cost thereof is high, and fast route switching of long vehicles or road and rail vehicles is difficult to be facilitated.

SUMMARY OF THE INVENTION

It is one objective of the invention to provide a routing device that features simple structure and low cost, and is capable of facilitating fast route switching of long vehicles or road and rail vehicles.

A technical solution of the invention is as follows:

A routing device of the invention comprises a sliding device, a rotating shaft, a pair of route rails, a pair of rams, and a pillow, wherein the route rail is disposed in the front of a railway track, the route rails are disposed on the rams, the rotating shaft is disposed at one end of the ram in the vicinity of the railway track, and connected to the pillow, the sliding device is disposed between the ram and the pillow, and the ram operates to laterally slide on the pillow.

The invention further comprises a pair of position sensors disposed in the front or on both sides of the front of the routing device, or on roads in the front or on both sides of the front of the routing device.

The invention further comprises a rail switch operating to drive the ram to laterally move whereby aligning the route rail with a steel wheel after the position sensor detects a position of the vehicle with respect to the front of the routing device.

An elastic jacking device and an anti-sliding device are disposed on the ram, the elastic jacking device is a spring, a rubber, or an elastic steel sheet disposed on the sliding device, and the anti-sliding device comprises an upper rack and a lower rack, or an upper clip key, a lower clip key, and a key slot.

A connecting rod is disposed between the rams, and both ends of the connecting rod are rotatably connected to the rams respectively.

A front rail surface of the route rail is in the shape of a sharp angle or an inclined angle, or the front of the route rail extends outwardly or narrows inwardly, or the route rails extend outwardly or narrow inwardly.

A slope gradually increasing from the front to the back is disposed on the front of the route rail, or a front rail surface of the route rail is lower than a rear rail surface thereof, and a transition portion is disposed between the front rail surface and the rear rail surface of the route rail.

A guide station is disposed between the rams, a guide slot on the guide station is disposed on a central line between the route rails or a pair of front route rails, and in the shape of a horn having a diameter gradually decreasing from the front to the back thereof, a guide cone disposed in the front of the steel wheel of the vehicle forces the guide station to drive the ram to laterally move by laterally pushing the guide slot whereby aligning the route rail with the steel wheel, and both ends of the guide station are rotatably connected between the rams.

Another routing device of the invention comprises a sliding device, a rotating shaft, a pair of route rails, a front ram, a rear ram, and a pillow, wherein the route rail is disposed in the front of a railway track, both ends of the route rail are rotatably connected to the front ram and the rear ram via the rotating shaft respectively, the sliding device is disposed between the front ram in the vicinity of the road and the pillow, the front ram operates to laterally slide on the pillow, and the rear ram is fixed on the pillow.

The invention further comprises a pair of position sensors disposed in the front or on both sides of the front of the routing device, or on roads in the front or on both sides of the front of the routing device.

The invention further comprises a rail switch operating to drive the front ram to laterally move whereby aligning the route rail with a steel wheel after the position sensor detects a position of the vehicle with respect to the front of the routing device.

An elastic jacking device and an anti-sliding device are disposed between the front ram and the pillow, the elastic jacking device is a spring, a rubber, or an elastic steel sheet disposed on the sliding device, and the anti-sliding device comprises an upper rack and a lower rack, or an upper clip key, a lower clip key, and a key slot.

A front rail surface of the route rail is in the shape of a sharp angle or an inclined angle, or the front of the route rail extends outwardly or narrows inwardly, or the route rails extend outwardly or narrow inwardly.

A slope gradually increasing from the front to the back is disposed on the front of the route rail, or a front rail surface of the route rail is lower than a rear rail surface thereof, and a transition portion is disposed between the front rail surface and the rear rail surface of the route rail.

A guide station is disposed on the front ram, a guide slot on the guide station is disposed on a central line between the route rails or a pair of front route rails, and in the shape of a horn having a diameter gradually decreasing from the front to the back thereof, a guide cone disposed in the front of the steel wheel of the vehicle forces the guide station to drive the ram to laterally move by laterally pushing the guide slot whereby aligning the route rail with the steel wheel, and both ends of the guide station are rotatably connected between the rams.

A further routing device of the invention comprises a pair of sliding devices, a rotating shaft, a pair of font route rails, a pair of rear route rails, a pair of rams, and a pillow, wherein the second ram is disposed below the back of the front route rail, the front route rail is disposed on the second ram in the vicinity of the road, the first ram is vertically disposed below the rear route rail, the rear route rail is disposed in the front of a railway track and fixed on the first ram, the rotating shaft is disposed below the front of the rear route rail and rotatably connected to the second ram, and the sliding devices are disposed in the front of the first ram, and between the second ram and the pillow.

The invention further comprises a pair of position sensors disposed in the front or on both sides of the front of the routing device, or on roads in the front or on both sides of the front of the routing device.

The invention further comprises a rail switch operating to drive the second ram to laterally move whereby aligning the route rail with a steel wheel after the position sensor detects a position of the vehicle with respect to the front of the routing device.

An elastic jacking device and an anti-sliding device are disposed on the first ram and the second ram, the elastic jacking device is a spring, a rubber, or an elastic steel sheet disposed on the sliding device, and the anti-sliding device comprises an upper rack and a lower rack, or an upper clip key, a lower clip key, and a key slot.

A connecting rod is disposed between the first rams, and both ends of the connecting rod are rotatably connected to the first rams respectively.

A front rail surface of the front route rail is in the shape of a sharp angle or an inclined angle, or the front of the front route rail extends outwardly or narrows inwardly, or the route rails extend outwardly or narrow inwardly.

A slope gradually increasing from the front to the back is disposed on the front of the route rail, or a front rail surface of the route rail is lower than a rear rail surface thereof, and a transition portion is disposed between the front rail surface and the rear rail surface of the route rail.

A guide station is disposed on the second ram, a guide slot on the guide station is disposed on a central line between the route rails or a pair of front route rails, and in the shape of a horn having a diameter gradually decreasing from the front to the back thereof, a guide cone disposed in the front of the steel wheel of the vehicle forces the guide station to drive the ram to laterally move by laterally pushing the guide slot whereby aligning the route rail with the steel wheel, and both ends of the guide station are rotatably connected between the rams.

A still another routing device of the invention comprises a pair of font route rails, a pair of rear route rails, a pair of front rams, a pair of rear rams, and a pillow, wherein the front route rail is disposed on the front ram, both ends of the rear route rail are rotatably connected to the front ram and the rear ram via a rotating shaft respectively, a sliding device is disposed between the front ram in the vicinity of a road and the pillow, the front ram operates to laterally slide on the pillow, and the rear ram is disposed in the front of a railway track and fixed on the pillow.

The invention further comprises a pair of position sensors disposed in the front or on both sides of the front of the routing device, or on roads in the front or on both sides of the front of the routing device.

The invention further comprises a rail switch operating to drive the front ram to laterally move whereby aligning the route rail with a steel wheel after the position sensor detects a position of the vehicle with respect to the front of the routing device.

An elastic jacking device and an anti-sliding device are disposed between the front ram and the pillow, the elastic jacking device is a spring, a rubber, or an elastic steel sheet disposed on the sliding device, and the anti-sliding device comprises an upper rack and a lower rack, or an upper clip key, a lower clip key, and a key slot.

A slope gradually increasing from the front to the back is disposed on the front of the front route rail, or a front rail surface of the front route rail is lower than a rear rail surface thereof, and a transition portion is disposed between the front rail surface and the rear rail surface of the front route rail.

A guide station is disposed on the front ram, a guide slot on the guide station is disposed on a central line between the route rails or a pair of front route rails, and in the shape of a horn having a diameter gradually decreasing from the front to the back thereof, a guide cone disposed in the front of the steel wheel of the vehicle forces the guide station to drive the ram to laterally move by laterally pushing the guide slot whereby aligning the route rail with the steel wheel, and both ends of the guide station are rotatably connected between the rams.

Advantages of the invention comprise: the invention features simple structure and low investigation cost, occupies small space, and facilitates convenient and fast route switching of vehicles; and a network is formed by roads and railways connected to each others, or roads and vehicle railways connected to each others, which show advantages of these two transportation methods; the invention is not only applicable for route of normal road and rail vehicles, but also for that of long multi-axis vehicles composed of tractors and trailers, or vehicle trains, and thus enabling the road and rail vehicles to be widely used and saving power.

BRIEF DESCRIPTION OF THE DRAWINGS

FIG. 2-1 illustrates a sliding device in FIG. 2 with an elastic jacking device;

FIG. 3-1 is a bottom view of FIG. 3;

FIG. 4-1 is a bottom view of FIG. 4;

FIG. 5-1 illustrates a front route rail extending outwardly;

FIG. 5-2 illustrates a front route rail narrowing inwardly.

DETAILED DESCRIPTION OF THE EMBODIMENTS

Detailed description will be given below in conjunction with specific embodiments.

Embodiment 1

Figure 1:
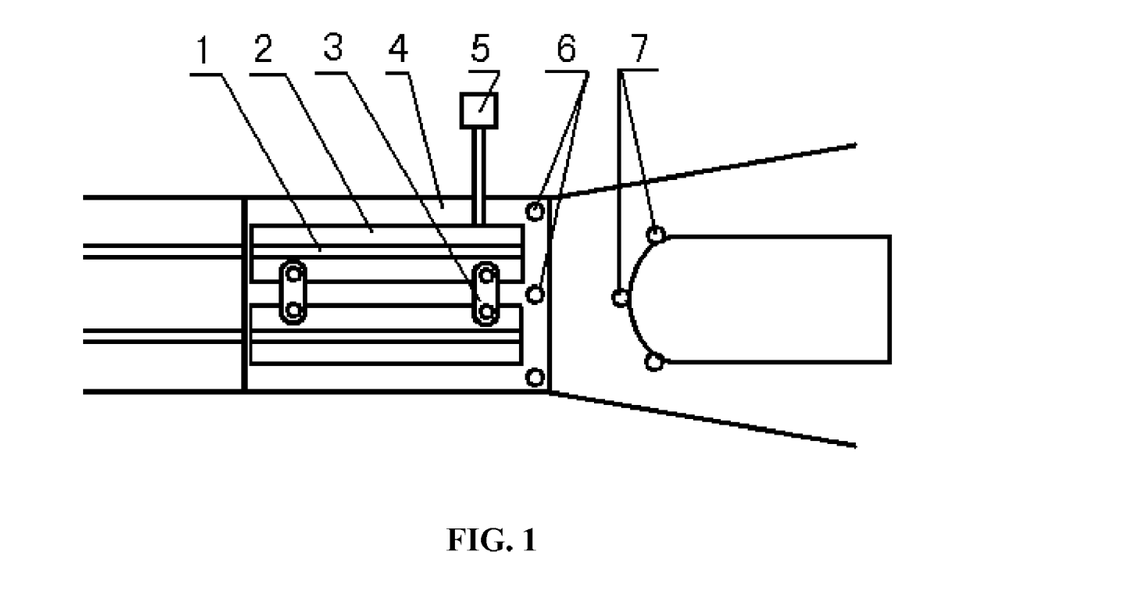
FIG. 1 is a schematic view of the invention.
Figure 2:
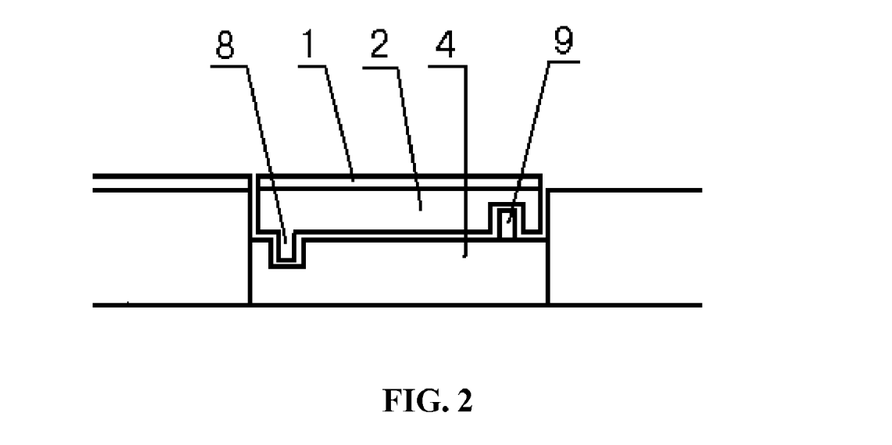
FIG. 2 illustrates a sliding device composed of steel wheels.

As shown in FIGS. 1 and 2, a route rail 1 is disposed in the front of a railway track, a pair of route rails are respectively fixed on a pair of first rams 2 disposed therebelow, the first ram 2 is disposed above a pillow 4, and there is a rolling steel wheel 9 therebetween. A rotating shaft 8 is disposed below the ram at the back of the route rail, and received in a shaft hole in the pillow 4. A connecting rod 3 is disposed between the first rams 2. Both ends of the connecting rod 3 are disposed on the rams via a rotating shaft and the shaft hole. A rail switch 5 is disposed on one side of the front of the route rail, and connected to the front on one side of the ram or the route rail via the switch bar or the ram. A pair of position sensors 6 are disposed at the center of the front of the route rail, or symmetric positions on both sides of the center of the front of the route rail, or on the ram, the pillow, or the road.

As a vehicle with steel wheels approaches the front of the routing device from a road, the position sensor detects a lateral position of the vehicle with respect to the front of the route rail via a sigh 7 or a signal generator. If the vehicle and the steel wheels therebelow are not aligned with the route rail, a control device starts a transmission device such as a rail switch and so on to drive the front of the route rail to move laterally whereby aligning the front of the route rail with the steel wheels below the vehicle. After the position sensor detects the front of the route rail is aligned with the steel wheel via the sign or the signal generator on the vehicle, or similar sensing devices, the controller disables the rail switch, and locks transmission devices such as the rail switch, a switch bar and so on (mechanically or via an electromagnetic lock). At this time, the steel wheels below the vehicle are capable of traveling on the route rail, and entering the railway track for operating via the route rail.

Figure 21:
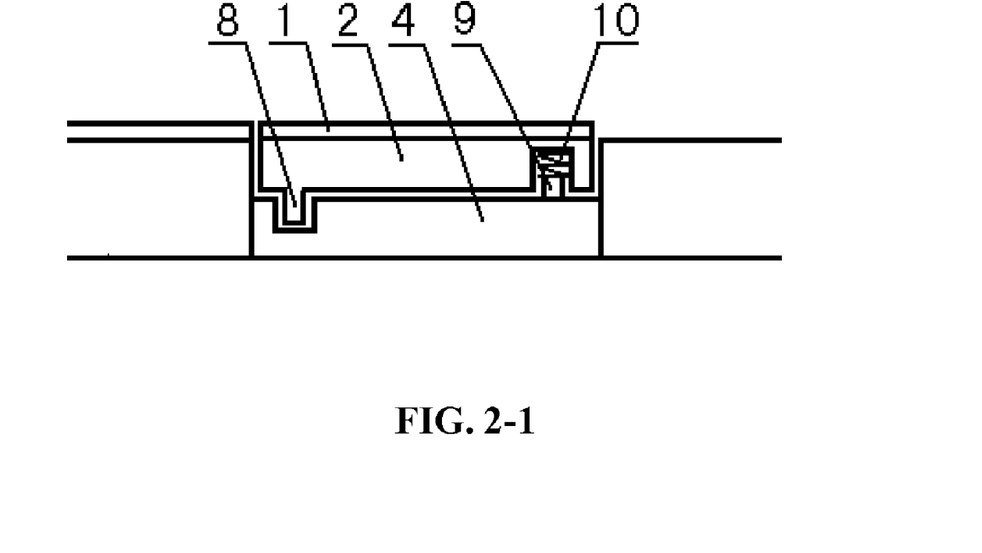

In application, an elastic jacking device is disposed on the ram (as shown in FIG. 2-1), and locking devices such as racks or clip keys are disposed between the ram and the pillow whereby replacing locking devices on the rail switch or the switch bar. As a spring 10 in the elastic jacking device upwardly abuts against the ram, key slots of an upper clip key and a lower clip key, or an upper rack and a lower rack are opened and separated, the ram is capable of laterally moving on the pillow. As the steel wheel travels on the route rail and downwardly presses the ram, the clip key and the key slot, or the upper rack and the lower rack are fit with each other whereby locking the ram and the pillow and ensuring the steel wheel stably and safely enters the railway track via the route rail.

Embodiment 2

Figure 3:
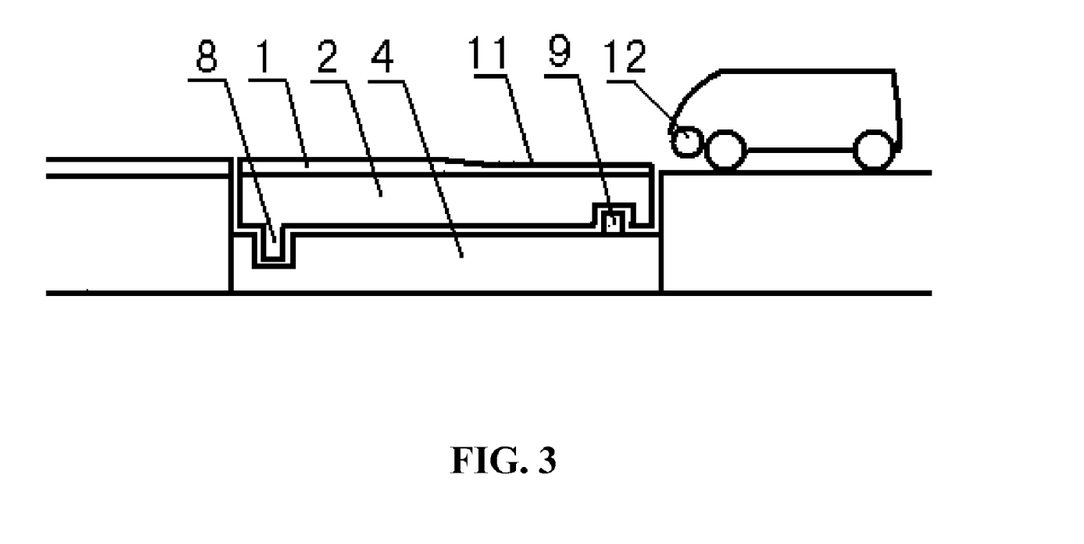
FIG. 3 illustrates application of a route rail.
Figure 31:
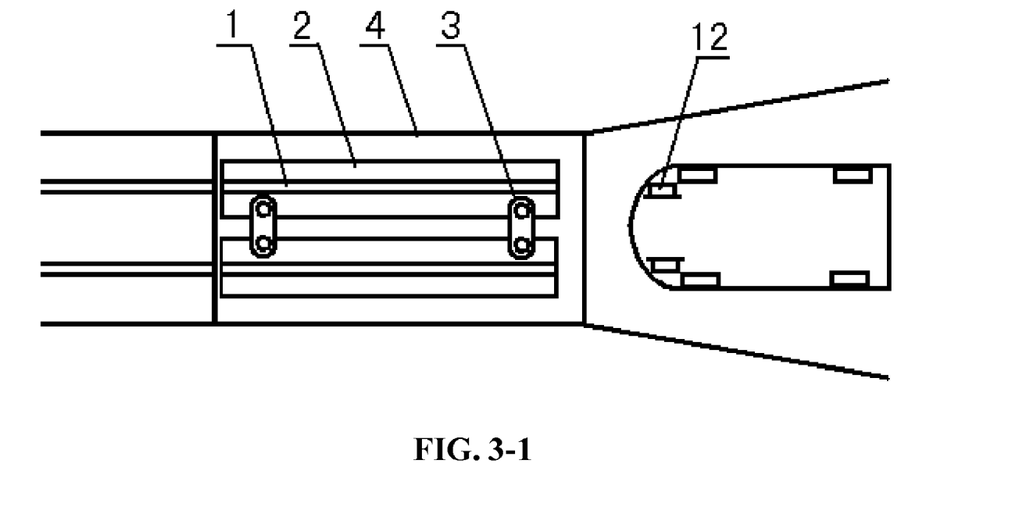

As shown in FIG. 3, a front rail surface 11 of a route rail 1 is lower than a rear rail surface thereof. As steel wheels below the vehicle enters the top of the front rail surface 11, a tread surface (surface) of the steel wheel is not contacted with the front rail surface, and the vehicle is borne by rubber wheels. A guide flange on one side of the steel wheel is contacted with one side of the front rail surface 11 of the route rail. As the front of the route rail is not aligned with the steel wheel, the guide flange pushes the other side of the front of the route rail whereby aligning the route rail with the steel wheel and ensuring the steel wheel is capable of traveling on the railway track via the route rail. A front of the route rail is in the shape of a sharp angle or an inclined angle, or fronts of two route rails extend outwardly or narrow inwardly. An elastic jacking device and a locking device are disposed between the ram and the pillow (as described in embodiment 1).

Embodiment 3

Figure 4:
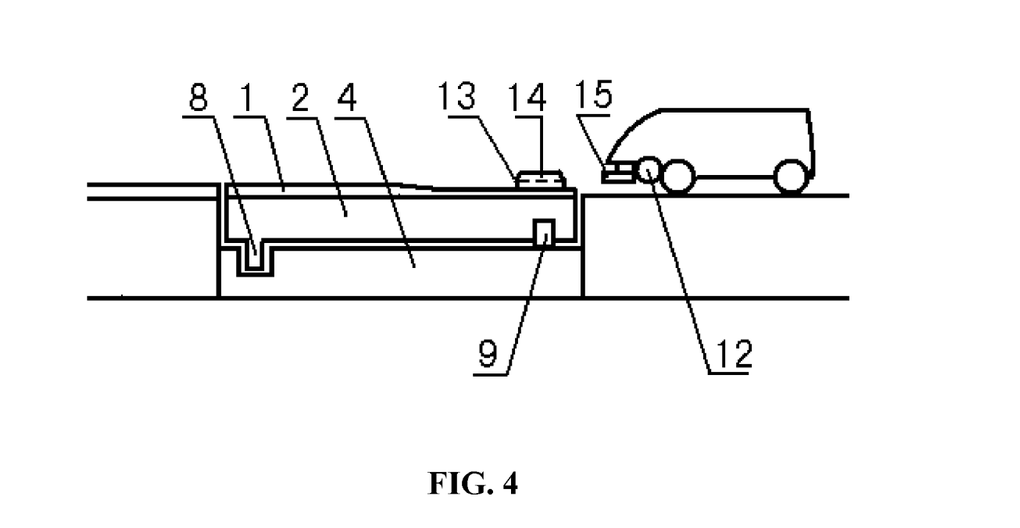
FIG. 4 illustrates application of a guide station and a guide slot in a routing device.
Figure 41:
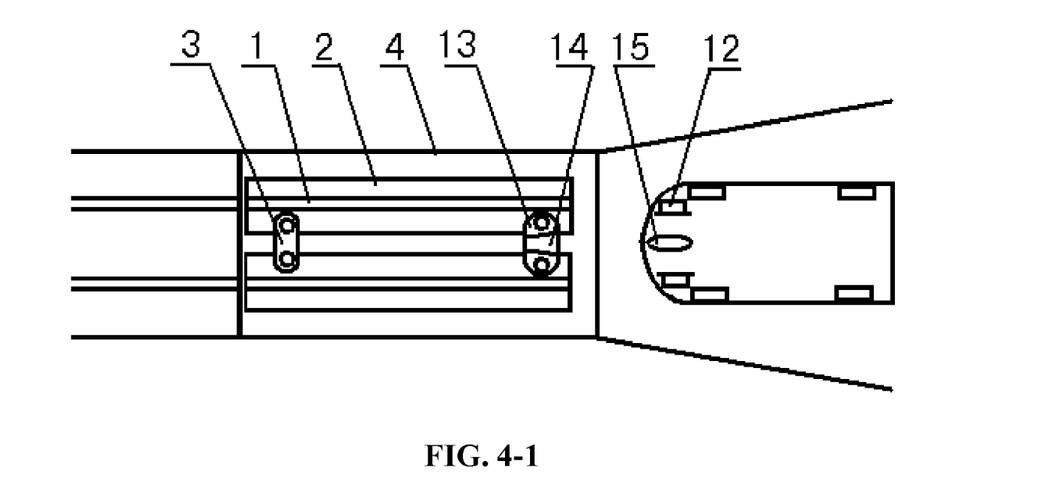

As shown in FIG. 4, a guide station 13 is disposed between fronts of two route rails, both ends of the guide station are disposed on rams below the route rails via rotating shafts and sleeves. A guide slot 14 in the shape of a horn having a diameter gradually decreasing from the front to the back thereof is disposed in the middle of the guide station. As the vehicle enters the route rail, a guide cone 15 below the vehicle is inserted in the front of the guide slot, whereby forcing the guide station deviating from a central line of the vehicle to move towards the center of the guide cone. Since the guide cone is disposed at the center of the steel wheels 12, and a width of the back of the guide slot 14 is slightly greater than that of the guide cone 15, as the guide cone passes through the guide slot from the front to the back, the guide slot drives the ram therebelow to move laterally, whereby aligning the route rail on the ram with the steel wheel and ensuring the steel wheel enters the railway track via the route rail. In application, an elastic jacking device and a locking device are disposed between the ram and the pillow (as described in embodiment 1).

Embodiment 4

Figure 5:
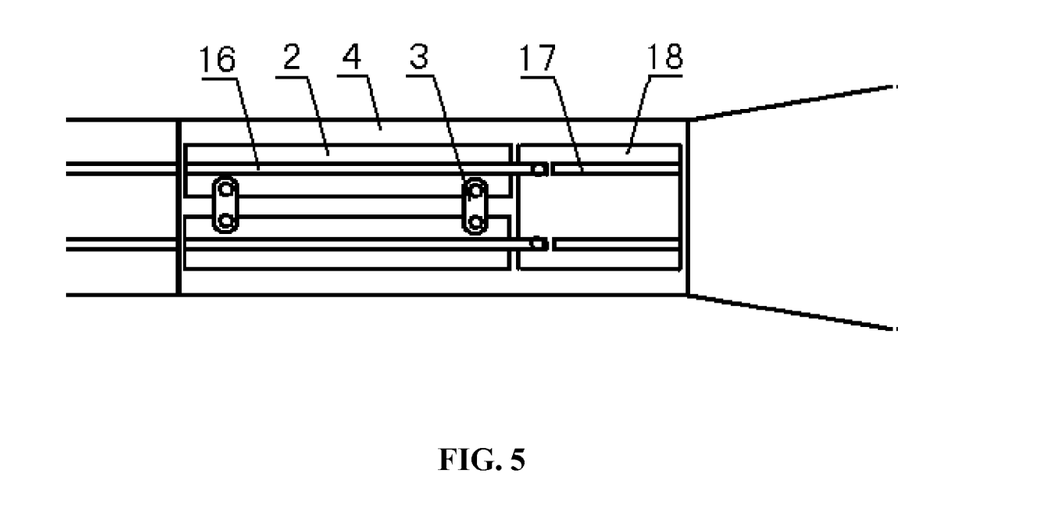
FIG. 5 illustrates application of a front route rail and a rear route rail.

As shown in FIG. 5, a route rail comprises a pair of front route rails 17 and a pair of rear route rails 16. The front route rails are fixed on a second ram 18 that is capable of laterally sliding, and the rear route rails are disposed on a first ram 2 vertically disposed therebelow and capable of laterally sliding. A rotating shaft below the back of the first ram 2 is received in a shaft hole of the pillow, and another shaft below the front of the rear route rail 16 is received in another shaft hole on the second ram 18. The front of the rear route rail 16 is disposed at the back of the front route rail 17. A rail switch, a guide slot, or a steel wheel flange drives the routing device to move, whereby aligning the route rail with the steel wheel and ensuring the steel wheel travels on the railway tracks via the front and the back of the route rail. In application, a position sensor is disposed on the second ram 18, or on a road in front thereof. An elastic jacking device and a locking device are disposed between the second ram 18, the first ram 2 and the pillow 4 (as described in embodiment 1). A rail surface of the front route rail 17 is lower than that of the rear route rail 16, and a transition portion is disposed therebetween. A guide station with a guide slot is disposed on the second ram 18 (as described in embodiment 3).

Figure 51:
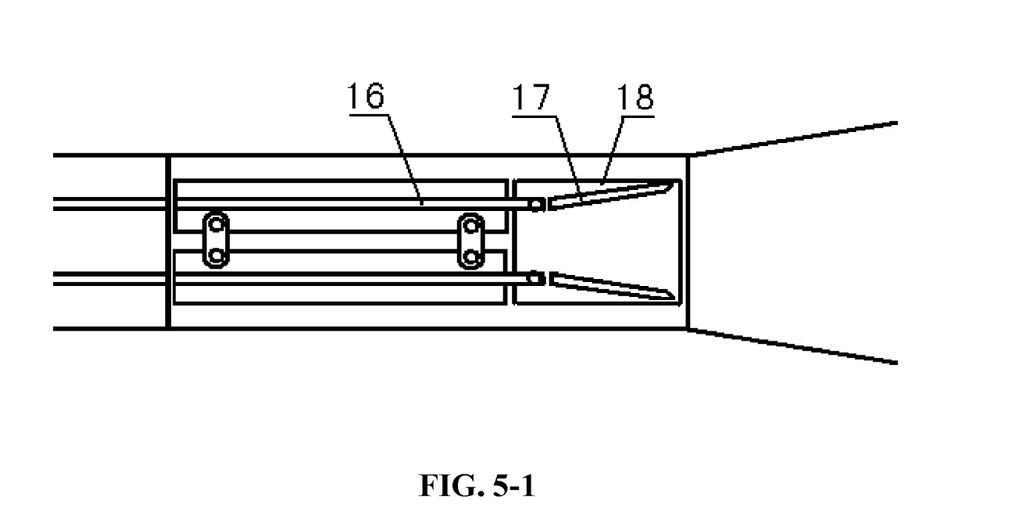
Figure 52:
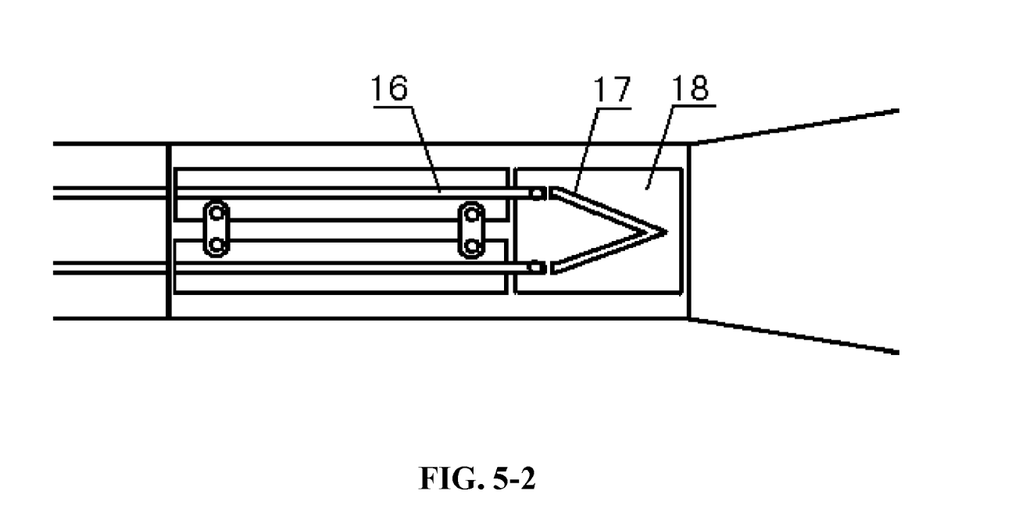

In application, the front route rails extend outwardly (as shown in FIG. 5-1) or narrow inwardly (as shown in FIG. 5-2), or fronts of the front route rails extend outwardly or narrow inwardly, or the front rail surface of the front route rail is in the shape of a sharp angle or an inclined angle, and a slope gradually ascending is disposed in the front of the front route rail.

The invention claimed is:

1. A routing device, comprising sliding device;
a rotating shaft;
a pair of route rails;
a pair of rams; and
a pillow;
wherein
said route rail is disposed in the front of a railway track;
said route rails are disposed on said rams therebelow;
said rotating shaft is disposed at one end of said ram in the vicinity of said railway track, and connected to said pillow;
said sliding device is disposed between said ram and said pillow; and
said ram operates to laterally slide on said pillow.

2. The routing device of claim 1, further comprising a pair of position sensors disposed in the front or on both sides of the front of said routing device, or on roads in the front or on both sides of the front of said routing device.

3. The routing device of claim 2, further comprising a rail switch operating to drive said ram to laterally move whereby aligning said route rail with a steel wheel after said position sensor detects a position of said vehicle with respect to the front of said routing device.

4. The routing device of claim 3, wherein
an elastic jacking device and an anti-sliding device are disposed on said ram;

said elastic jacking device is a spring, a rubber, or an elastic steel sheet disposed on said sliding device; and said anti-sliding device comprises an upper rack and a lower rack, or an upper clip key, a lower clip key, and a key slot.

5. The routing device of claim 3, wherein a connecting rod is disposed between said rams, and both ends of said connecting rod are rotatably connected to said rams respectively.

6. The routing device of claim 1, wherein a front rail surface of said route rail is in the shape of a sharp angle or an inclined angle, or a front of said route rail extends outwardly or narrows inwardly, or two route rails extend outwardly or narrow inwardly.

7. The routing device of claim 1, wherein a slope gradually increasing from the front to the back is disposed on the front of the route rail, or a front rail surface of said route rail is lower than a rear rail surface thereof; and a transition portion is disposed between said front rail surface and said rear rail surface of said route rail.

8. The routing device of claim 1, wherein a guide station is disposed between said rams;

a guide slot on said guide station is disposed on a central line between said route rails or a pair of front route rails, and in the shape of a horn having a diameter gradually decreasing from the front to the back thereof;

a guide cone disposed in the front of said steel wheel of said vehicle forces said guide station to drive said ram to laterally move by laterally pushing said guide slot whereby aligning said route rail with said steel wheel; and both ends of said guide station are rotatably connected between said rams.

* * * * *